United States Patent [19]

Nyman et al.

[11] 4,011,297

[45] Mar. 8, 1977

[54] IN-SITU pH MEASUREMENT OF ORGANIC-CONTINUOUS SOLVENT EXTRACTION PROCESSES

[75] Inventors: Bror Göran Nyman, Pori; Raimo Juhani Leimala, Harjavalta; Erik Gustav Bäck, Kokkola, all of Finland

[73] Assignee: Outokumpu Oy, Helsinki, Finland

[22] Filed: Apr. 1, 1975

[21] Appl. No.: 564,044

Related U.S. Application Data

[63] Continuation-in-part of Ser. No. 362,731, May 22, 1973, abandoned.

[30] Foreign Application Priority Data

June 2, 1972 Finland .................................. 721565

[52] U.S. Cl. .................................. 423/24; 423/100; 423/139; 423/658.5; 75/101 BE; 204/195 G; 204/1 T; 324/30 R

[51] Int. Cl.$^2$ .................. C01G 3/00; C01G 9/00; C01G 53/00; G01N 27/43

[58] Field of Search ......... 423/24, 100, 139, 658.5; 75/101 BE; 204/195 R, 1 H, 195 G; 324/30 R; 23/230 R

[56] References Cited

UNITED STATES PATENTS

| | | | |
|---|---|---|---|
| 2,607,718 | 8/1952 | Suthard | 204/195 R |
| 2,752,307 | 6/1956 | Baran et al. | 205/195 R |
| 2,782,151 | 2/1957 | Suthard | 324/30 R |
| 3,251,646 | 5/1966 | Alon et al. | 423/24 |
| 3,428,449 | 2/1969 | Swanson | 75/101 BE |
| 3,455,680 | 7/1969 | Ashbrook et al. | 75/101 BE |
| 3,479,378 | 11/1969 | Orlandini et al. | 75/101 BE |
| 3,507,645 | 4/1970 | Spitzer | 75/101 BE |
| 3,532,490 | 10/1970 | Burkin | 75/101 BE |
| 3,625,655 | 12/1971 | Culp et al. | 324/30 R |
| 3,676,106 | 7/1972 | Hazen | 423/24 |

*Primary Examiner*—Oscar R. Vertiz
*Assistant Examiner*—Brian E. Hearn
*Attorney, Agent, or Firm*—Brooks Haidt Haffner & Delahunty

[57] ABSTRACT

An improved liquid-liquid extraction process for separating metals from each other in which an aqueous solution containing metals is mixed with an organic solution containing an extraction agent that releases hydrogen ions. A mixture of aqueous dispersed phase and an organic continuous phase is formed and the pH of the aqueous dispersed phase is controlled by the addition of a neutralizing agent to the mixture of the aqueous dispersed phase and the organic continuous phase on the basis of pH measurements made with pH electrodes immersed in the mixture of the phases. These direct measurements permit accurate adaptation of the rate of addition of the neutralizing agent to the rate at which hydrogen ions are being released so that the pH of the aqueous dispersed phase is kept substantially constant. The phases are separated from each other after transfer of metal ions from the aqueous to the organic phase, and the separated metal values are recovered.

11 Claims, No Drawings

IN-SITU pH MEASUREMENT OF ORGANIC-CONTINUOUS SOLVENT EXTRACTION PROCESSES

CROSS-REFERENCE TO RELATED APPLICATION

This application is a continuation-in-part of our application Ser. No. 362,731 filed May 22, 1973, now abandoned.

BACKGROUND OF THE INVENTION

1. Field of the Invention

The invention relates to the field of separating metals from each other by extraction.

2. Description of the Prior Art

Several of the currently used extraction agents meant for liquid-liquid extraction are acid by nature, i.e., they are capable of releasing hydrogen ions which can be replaced by metal ions according to the following equation, in which HA indicates an extraction agent of this type, Me indicates the metal of valency n and aq. or org. indicates that the species concerned is present in the aqueous or organic phase respectively

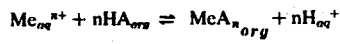

$$Me_{aq}^{n+} + nHA_{org} \rightleftharpoons MeA_{n_{org}} + nH_{aq}^{+}$$

When the extraction agent thus binds metal which is thereby transferred from the aqueous phase into the organic phase which contains the extraction agent, an equivalent number of hydrogen ions is simultaneously released into the aqueous phase and the pH of the aqueous phase decreases. It is generally known that when the acid extraction agents discussed above are used, the transfer of metal from the aqueous phase into the organic phase according to the above reaction is highly dependent on the pH of the aqueous solution and that each metal has a very limited pH range within which the extraction is effective. When the pH of the aqueous phase decreases as shown above during the extraction and the pH of the initial solution cannot be raised before the extraction section as this will cause precipitation of metal hydroxides, the effectiveness of the extraction decreases as the acidity increases, and finally a state of balance is reached, at which time the aqueous phase may still contain considerable amounts of the metal to be removed, depending on the content of this metal in the initial solution.

Thus it is easy to understand that the entire capacity of the extraction solvent cannot be utilized. So far, attempts have been made to eliminate this disadvantage in the following ways:

First, by treating only weak metal salt solutions with metal contents of 1–2 g/l at the most, in which case the change of the pH of the aqueous phase remains minute.

Second, by converting, at a separate stage, the acid extraction agent into a salt form with an alkali, in which case other ions, such as sodium, ammonium, calcium or magnesium ions, are released instead of hydrogen ions. The conversion of the extraction agent into a salt form, however, requires an additional treatment stage and often causes the formation of a third phase, and additives such as alcohols are needed to eliminate this. In addition, when a salt form of the extraction agent is used, its selectivity often decreases.

Third, by separating part of the extracted aqueous phase, by adding a neutralizing agent into it, and by returning this neutralized part of the aqueous phase into the mixing chamber after settling (U.S. Pat. No. 3,479,378), or by adding a neutralizing agent to the aqueous phase between the extraction stages. In these methods the addition of the neutralizing agent is not controlled on the basis of the reactions which take place in the mixing space but by, for example, measuring the pH of the aqueous phase which results from the settling of the dispersion. Because the number of hydrogen ions produced during the extraction depends on the amount of metal transferred into the organic phase, these indirect methods are not satisfactory, expecially if the metal content of the solution coming to the extraction stage varies.

Fourth, by producing new extraction agents which are effective at a lower pH (Cf. General Mills, Inc. series LIX 63, LIX 64, LIX 70), but then the re-extraction of metals from the organic phase becomes more difficult.

U.S. Pat. No. 3,507,645 relates to a separation process wherein a neutralizing agent is added before or during extraction, but there is no discussion of pH control during extraction on the basis of measurements made with electrodes present in the dispersion of a mixing chamber. U.S. Pat. No. 3,532,490 to Burkin mentions the use of salt forms of acid extraction agents or adding a neutralizing agent to a dispersion. But Burkin does not teach pH regulation based on direct determination of electrode potentials in the dispersion.

Hazen U.S. Pat. No. 3,676,106 discusses promotion of the extraction reactions of acid cationic exchange agents by extracting acid produced into an amine phase from which the acid is recovered. Thus, acid removal rather than neutralization is contemplated by Hazen. U.S. Pat. No. 3,251,646 describes prior known methods of maintaining pH of an extraction process within a desired range but does not mention the use of pH electrodes in a mixing chamber during extraction. It should be noted that it in laboratory tests usually is easy to reach a desired pH value using a calculated addition of the neutralizing agent required.

Swanson U.S. Pat. No. 3,428,449 relates to a copper extraction process wherein the pH of an aqueous solution is limited to the range 1.7 – 3.0 and only raising the pH if it approaches the range 1.4 – 1.5. But Swanson contemplates recording pH values determined for his aqueous phases of the settlers in a three-stage extraction process. There is no suggestion of regulation based on measurements made by pH electrodes permanently placed in the dispersion in a mixing chamber.

U.S. Pat. No. 2,782,151 relates to a method of testing oils by taking a small test sample and mixing it with sufficient water to produce a water-continuous dispersion comprising an external water phase with small droplets of oil dispersed therein. This reference requires the use of a dispersing agent to promote an oil-in-water emulsion in order to operate and furthermore, it is said to be essential that the dispersing agent imparts such characteristics to the aqueous phase that said aqueous phase tends to wet the surface of the glass electrode whereby oil coating of the electrode can be prevented. Coating or poisoning of glass electrodes is recognized as a danger to be avoided.

For some reason the prior art references discussed above have not suggested the possibility of direct measurement and control of pH by means of conventional electrodes, such as glass/calomel electrodes, permanently immersed in the liquid in mixers of an extraction process. The references show avoidance of direct measurement and roundabout procedures.

SUMMARY OF THE INVENTION

Surprisingly, it has been observed that the disadvantages of the above methods can be eliminated using the method according to the present invention. The invention is based on a discovery according to which an almost correct value of the pH of the aqueous phase can be achieved by measuring pH using conventional pH electrodes located at points in the mixing chamber, where an aqueous dispersed phase and an organic continuous phase are mixed into a dispersion during the measurement. It was further observed that the response time of the electrodes was short enough to effect pH control using the electrode signals obtained directly from the mixing chamber. In this way the pH can be maintained close to a desired value. According to performed tests reliable pH values can still be obtained from a dispersion after continuous pH control over a period of several days using the same electrodes. The addition of a suitable neutralizing agent can take place by generally known methods and by controlling this addition with help of the measurements. For example, the neutralizing agent can be added stepwise when and only when the pH as measured by the electrodes deviates by a predetermined amount from an optimum value.

The advantage of the method according to the invention is that the entire capacity of the extraction agent can thereby be utilized even when strong metal salt solutions are treated. No additional treatment stages are necessary, and there is no time difference between the reaction and the pH regulation. Both the dispersed aqueous phase and the continuous organic phase can be circulated back into the mixing space, but the circulation of neither is necessary. The desired pH value is easily obtained and can be kept constant with precision and dependability in spite of possible changes within the process, because the control can be easily automated. Thus other process variables do not affect the pH and can be chosen independently of the maintained pH. Another great advantage is that in a multiple-stage extraction system the pH control value of each stage can be selected independently of other stages, and thus even difficult separations can be simplified by using the most advantageous pH gradient between the various extraction stages.

Certain drawbacks of prior art techniques are eliminated. There is no need to take steps to prevent the organic phase from coating the electrode, so high flow velocities and/or dispersing agents need not be employed, because the organic phase containing the hydrogen ion releasing extraction agent will not tend to inactivate the electrodes.

In conducting the pH control it is advisable to use a separate pH control line for each pH controlled stage, in which case a most reliable and accurate control system is obtained. In several cases the pH control is not necessary at all stages but at some extraction stage the pH remains sufficiently within the desired range with the help of the pH controls of the adjacent stages.

In most cases the pH values of the extraction can be selected so that no separate phase-scrubbing stage is necessary, but in certain cases the addition of such a stage may be advisable.

The regeneration of the extraction agent, that is, the re-extraction of the metals into an aqueous phase, can take place by known methods, e.g., treatment with an aqueous solution of a mineral acid, in which case the metal is obtained in the form of an aqueous solution, or direct reduction from the organic phase using hydrogen gas in which case the metal is obtained in powder form.

As those familiar with the art will easily understand the pH control according to the invention can also be used at the scrubbing and re-extraction stages if an especially selective separation of metals is desired at these stages. Usually the method used at these stages is, however, such that pH control is not necessary.

DESCRIPTION OF THE PREFERRED EMBODIMENTS

The method according to the invention can be applied when any acid extraction agent is used. Suitable agents include organic phosphoric acids with the formula

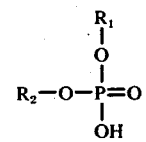

in which $R_1$ is an alkyl, aryl, or alkyl-aryl radical or hydrogen and $R_2$ an alkyl, aryl or alkyl-aryl radical; the corresponding thio- compounds; carboxylic acids, e.g., naphthenic acids and versatic acids; substituted carboxylic acids such as $\alpha$-bromo-lauryl acid; sulphonic acids; and hydroxy-oximes, e.g., the commercial products LIX 63, LIX 64, LIX 64N, and LIX 70. Furthermore, extraction solvents which, in addition to one acid extraction agent, contain one or more other acid extraction agents can be used according to this method. The extraction solvent can also contain neutral extraction agents and other additives such as alcohols. In some embodiments of the invention, HDEHP alone or in combination with another extraction agent is particularly preferred.

To obtain better physical properties, extraction agents are usually used in solutions in which the dilution materials used ar hydrocarbons or hydrocarbon mixtures, preferably light petroleum and especially kerosene, but other solvents can be used. In some cases, undiluted extraction agents are used.

Owing to the nature of the method according to the invention, the method is by no means limited to specific metals but can be applied to the separation and recovery processes of all metals on the basis of the liquid-liquid extraction principle.

The added neutralizing agent is usually an alkali, but when there are specific reasons to do so, acids can be used. The neutralizing agent is usually in an easily dispensable form, such as liquid or gas, for example, ammonia, sodium hydroxide, potassium hydroxide, sodium carbonate, in the form of aqueous solutions, or ammonia as a gas or mixed with some other gas such as air or nitrogen. However, if the precision of the pH control allows, even solid neutralizing agent, such as lime or magnesium oxide, can be used. If acid is added, it is in the form of a solution.

It has been found that conventional pH electrodes can be used to monitor the pH of organic continuous dispersions which contain acidic extractants. Almost correct pH values are still obtained with glass/calomel electrodes, which have permanently been located in mixer dispersions for several weeks. This will be most convincingly clear from Example 2 below wherein in the described continuous separation experiment pH control in the organic continuous mixer dispersions proved to strongly contribute to the successful zinc-/cobalt, nickel separation obtained.

The invention is further illustrated by the following examples. It should be understood that the various extraction agents, metals or amounts thereof used should not be construed to unduly limit this invention.

EXAMPLE 1

Batch experiments were made in a laboratory to separate zinc and cadmium from cobalt and nickel. A aqueous solution containing sulphates of these metals and a di-(2-ethyl-hexyl)-phosphoric acid solution (HDEHP) were mixed in a glass container with an organic/aqueous volume ratio of 1:1 under organic continuous conditions. The pH electrodes were immersed in the dispersion and a 6 percent aqueous solution of ammonia was added until the desired pH was obtained. Thereafter mixing was continued for 10 minutes, then the phases were separated, analyzed, and the pH of the obtained water phase was measured. The initial solution contained 14 g Zn/l, 5 g Cd/l, and 5 g Ni/l (experiment 1). Experiment 2 was carried out by the same method with a solution which contained 5 g Cd/l, 5 g Co/l, and 5 gNi/l.

TABLE 1

|  | pH of dispersion | pH of water phase | $E_{Zn}$ % | $E_{CD}$ % | $E_{Co}$ % | $E_{Ni}$ % |
| --- | --- | --- | --- | --- | --- | --- |
|  | 2.45 | 2.5 | 95.6 | 6.0 | 1.7 | 0.7 |
| Experiment 1 | 3.0 | 3.0 | 99.5 | 20.2 | 3.5 | 1.0 |
|  | 3.5 | 3.5 | 99.9 | 46.0 | 8.3 | 1.5 |
| 0.75 M HDEHP | 4.0 | 4.0 | 99.97 | 78.0 | 35.2 | 2.1 |
|  | 2.4 | 2.4 | — | 49.0 | 2.3 | 1.1 |
| Experiment 2 | 2.7 | 2.7 | — | 66.7 | 3.6 | 1.4 |
|  | 3.0 | 3.05 | — | 79.6 | 12.6 | 2.9 |
| 0.5 M HDEHP | 3.6 | 3.6 | — | 94.2 | 30.9 | 8.4 |
|  | 4.0 | 4.05 | — | 96.4 | 50.9 | 21.6 |

E = extraction %

The results indicate that the major part of the zinc can easily be separated from the other metals present in one single stage, but if the demands are higher, the number of stages can be increased. Cadmium can also be easily extracted from cobalt and nickel in a few stages.

EXAMPLE 2

Separation of zinc from a cobalt-nickel-zinc solution was carried out with a continuous six-stage extraction apparatus using 20 vol-% HDEHP in kerosene as solvent. In addition to the metals mentioned above, the initial solution contained magnesium sulphate and ammonium sulphate and its pH was about 5 due to previous treatment stages. The extraction of zinc took place in four stages, each with a separate pH control line with electrodes located in an organic continuous phase. Because of the high pH of the initial solution the pH was brought down with sulphuric acid to a value 1.5 at the first extraction stage. The neutralizing agent used in all other extraction stages was a 25% ammonia solution. The re-extraction of zinc from the organic phase was carried out in two stages with a sulphuric acid solution which contained 150 g $H_2SO_4$/l.

The flow rate of the initial solution was 75 l/h and the organic/aqueous volume ratio in the extraction stages was 1:1. In the re-extraction stages the organic/aqueous volume ratio was 3.6:1. The temperature maintained in the extraction stages was 60° C.

The daily mean values of the different stages shown in Table 2 were obtained by this procedure.

Table 2

|  | pH | Water phase | | | Organic phase | |
| --- | --- | --- | --- | --- | --- | --- |
|  |  | Co g/l | Ni g/l | Zn g/l | Co g/l | Zn g/l |
| Extraction |  |  |  |  |  |  |
| Stage 4 | 4.4 | 11.7 | 6.0 | 0.0004 | 8.0 | 0.025 |
| Stage 3 | 3.9 | 19.9 |  | 0.0015 | 7.0 | 0.13 |
| Stage 2 | 2.8 | 19.0 |  | 0.12 | 1.8 | 5.4 |
| Stage 1 | 1.5 | 13.9 |  | 5.4 | 0.012 | 7.5 |
| Feed | 4.9 | 12.3 | 6.3 | 7.5 |  |  |
| Re-extraction |  |  |  |  |  |  |
| Stage 2 |  | 0.046 | 0.013 | 27.3 | 0.009 | 1.9 |
| Stage 1 |  | 0.003 |  | 0.82 | 0.005 | 0.015 |

Thus, in four stages the zinc content of the cobalt-nickel solution was brought down from 7.5 g/l to 0.4 mg/l, when at the same time only about 0.1% of the cobalt was removed with the zinc solution.

EXAMPLE 3

The following is a method of separating zinc and copper from cobalt and nickel. This separation is considerably simpler to obtain using direct pH control than using roundabout methods taught by the prior art.

For these extraction experiments, a sulphate solution was prepared with the following metal contents: Co 25 g/l, Ni 10 g/l, Zn 10 g/l, and Cu 10 g/l. After some preliminary experiments a light petroleum solution containing 0.75 M HDEHP and 20% vol. LIX 64 N was chosen as a suitable extraction solvent. A comparison was also carried out by using a 0.75 M HDEHP solution as such.

The experiments were performed with an organic/aqueous volume ratio of 1.2:1 and by bringing the pH of the organic continuous dispersion to the desired value in each batch experiment during extraction by continuously measuring the pH of the dispersion. The neutralizing agent used was a mixture of ammonia and air. The results of the experiment are shown in Table 3.

Table 3

|  | pH | $E_{Zn}$ % | $E_{Cu}$ % | $E_{Co}$ % | $E_{Ni}$ % |
| --- | --- | --- | --- | --- | --- |
| Experiment 1 | 3.04 | 99.3 | 44.8 | 4.0 | 2.0 |
| 0.75 M HDEHP | 3.50 | 99.9 | 71.7 | 7.5 | 4.0 |
|  | 4.09 | 99.9 | 85.8 | 16.0 | 3.0 |
| Experiment 2 | 1.27 | 37.4 | 33.0 | 0.3 | 2.0 |
| 0.75 M HDEHP + | 2.08 | 89.6 | 68.2 | 1.0 | 2.0 |
| 20 vol. % | 2.86 | 99.2 | 93.3 | 4.1 | 3.0 |
| LIX 64 N | 3.71 | 99.9 | 98.8 | 17.1 | 3.0 |

The obtained results indicate that the pH range which can be used for separating copper from cobalt and nickel is rather narrow when a HDEHP solution alone is used, but if LIX 64 N is added to this solution, the range can be widened. However, even in this case 3-4 stages are required for the separation of these metals.

If the purpose is to separate the metals zinc and copper from each other, a mere HDEHP solution is more effective than the above mixture.

EXAMPLE 4

Comparative extraction experiments were carried out with two extraction solvents one of which a 0.9M light petroleum solution of the naphthenic acid NA 230 SP and the other a 0.45M light petroleum solution of the corresponding nickel naphthenate. The latter had been equilibrated with an aqueous solution, which at the equilibrium obtained contained 0.5M nickel and the pH of which was 7.

The initial solution used in these extraction experiments was a sulphate solution which contained 25 g Ni/l, 10 g Cu/l, and 10 g Zn/l, and the pH of which was 1.0.

When the extraction was carried out with nickel naphthenate, the pH could be changed by varying the organic/aqueous volume ratio. The dependence of the pH value on the used phase ratio is evident from Table 4, which also shows the obtained extraction results. Comparative, parallel experiments were made with naphthenic acid with the same phase ratios as when using naphthenate, and the pH was raised to the same values with direct pH control as in the previous experiments with the pH electrodes immersed in the dispersion which with the three highest organic/aqueous phase ratios was of the organic continuous type.

Table 4

| $\frac{V_{org}}{V_{aq}}$ | pH | Nickel Naphthenate $E_{Cu}$ % | $E_{Zn}$ % | Naphthene acid $E_{Cu}$ % | $E_{Zn}$ % |
|---|---|---|---|---|---|
| 0.53 | 3.6 | 23.0 | 0.9 | 27.0 | 2.2 |
| 0.83 | 4.6 | 97.7 | 6.3 | 96.9 | 9.0 |
| 1.0 | 5.2 | 99.68 | 21.6 | 99.67 | 19.5 |
| 2.8 | 5.8 | 99.93 | 92.2 | 99.95 | 93.5 |

The table indicates that there is no significant difference in the extraction results.

However, the use of a salt form causes several difficulties; converting the acid into a salt often causes the formation of a third phase; the ratio of the salt part to the acid part of the extraction agent may vary, easily resulting in a variation of the pH during extraction even though the ratio of the phase flows can be controlled; the result of the extraction is usually very apt to change when the ratio of the phase flows changes because then the ratio of the extraction agent to the metals to be extracted also changes in addition to the pH and the effect of this change is along the same lines as that of the pH change.

By using direct pH control with electrodes immersed in the organic continuous dispersion, all these disadvantages can be eliminated and the control values can be chosen according to the prevailing situation. The phase ratio can also be changed without thereby causing a change in the pH values of the extraction.

What is claimed is:

1. In an improved liquid-liquid extraction process for separating metals from each other of the type wherein an aqueous solution containing metals is mixed with an organic solution containing at least one extraction agent which releases hydrogen ions and a hydrocarbon diluent, whereby a mixture of aqueous and organic phases is formed, the pH of the aqueous phase being controlled by the addition of a neutralizing agent, the phases are separated after transfer of metals from the aqueous to the organic phase, when necessary, metals are removed from the organic phase by scrubbing, the extraction agent is regenerated, and metal is recovered, the improvement comprising controlling the pH of an aqueous dispersed phase by adding said neutralizing agent to a mixture of said aqueous dispersed phase and an organic continuous phase on the basis of pH measurements made by means of pH electrodes immersed in said mixture for closely adapting the rate of addition of said neutralizing agent to the rate at which hydrogen ions are being released to maintain the pH of said aqueous dispersed phase substantially constant.

2. The improved method of claim 1 wherein said extraction is performed in a multiple-stage extraction system and including independently measuring and controlling the pH at several stages by means of pH electrodes immersed in the mixture at each such stage to maintain the proper pH values for the selective extraction of different metals as different stages.

3. The improved method of claim 1 in which extraction is performed in several stages and wherein an organic solution containing regenerated extracted agent is recycled and mixed with an aqueous solution at one of said stages, said pH measurements being made at said one of said stages.

4. The improved method of claim 1 in which the pH electrodes are glass/calomel electrodes and in which the neutralizing agent is added stepwise when and only when the pH value measured by said electrodes deviates by a predetermined amount from an optimum pH value.

5. In an improved liquid-liquid extraction process for separating metals from each other, the steps of:
providing an organic solution of at least one extraction agent which releases hydrogen ions with a hydrocarbon or a mixture of hydrocarbons as a diluent;
mixing with said organic solution an aqueous solution containing metals to form a mixture consisting of an organic continuous phase and an aqueous dispersed phase;
measuring the pH by means of pH electrodes immersed in said mixture to determine the rate at which hydrogen ions are being released by said extraction agent;
controlling the pH of the aqueous dispersed phase by adding to said mixture a neutralizing agent, the rate of addition of said neutralizing agent being controlled in accordance with said pH measurement to maintain the pH of said aqueous dispersed phase substantially constant;
permitting the transfer of metals from said aqueous phase to said organic phase;
separating the said phases after the transfer of metals to said organic phase;
recovering metal values from said organic phase; and regenerating said extraction agent.

6. The process of claim 5 wherein said diluent is light petroleum.

7. The process of claim 5 wherein said diluent is kerosene.

8. The process of claim 5 wherein the metals to be separated are two or more of zinc, cadmium, cobalt, nickel and copper and wherein the diluent is kerosene.

9. The process of claim 5 wherein the extraction is performed in a multiple-stage extraction system and including independently measuring and controlling the pH at several stages by means of pH electrodes immersed in the mixture at each such stage to maintain the proper pH values for the selective extraction of different metals at different stages.

10. The process of claim 5 in which the extraction is performed in several stages and wherein an organic solution containing regenerated extractant is recycled and mixed with an aqueous solution at one of said stages, said pH measurements being made at said one of said stages.

11. The process of claim 5 in which the pH electrodes are glass/calomel electrodes and in which the neutralizing agent is added stepwise when and only when the pH value measured by said electrodes deviates by a predetermined amount from an optimum pH value.

* * * * *